(No Model.)  2 Sheets—Sheet 1.
H. CAMPBELL.
RECLEANING ATTACHMENT FOR CLOVER THRASHING AND HULLING MACHINES.
No. 315,906.  Patented Apr. 14, 1885.
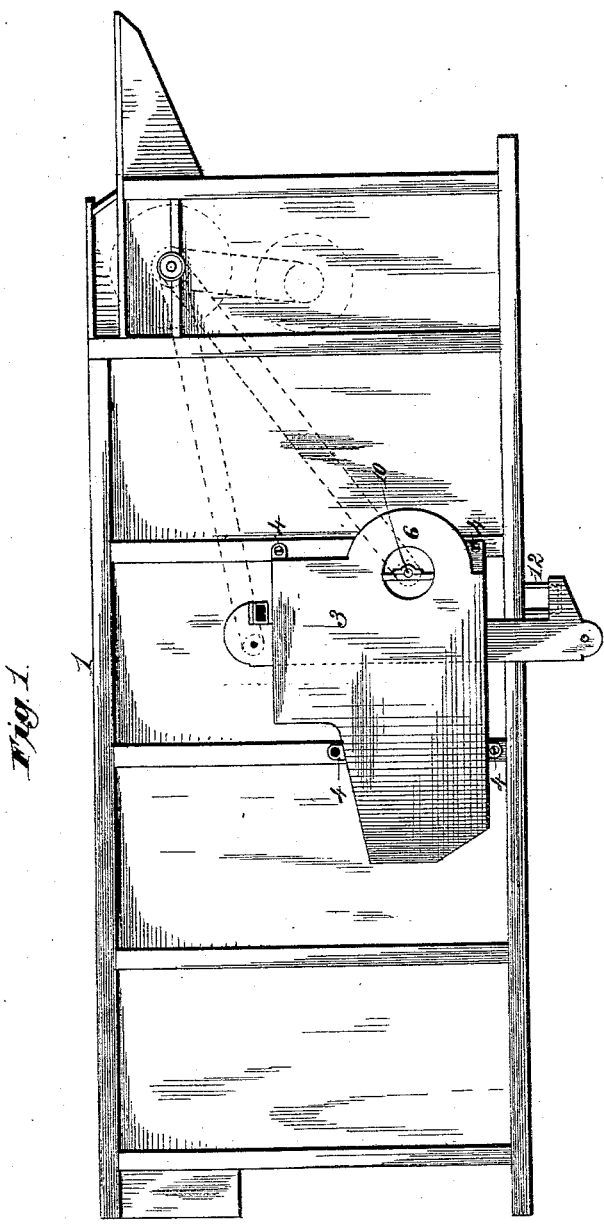

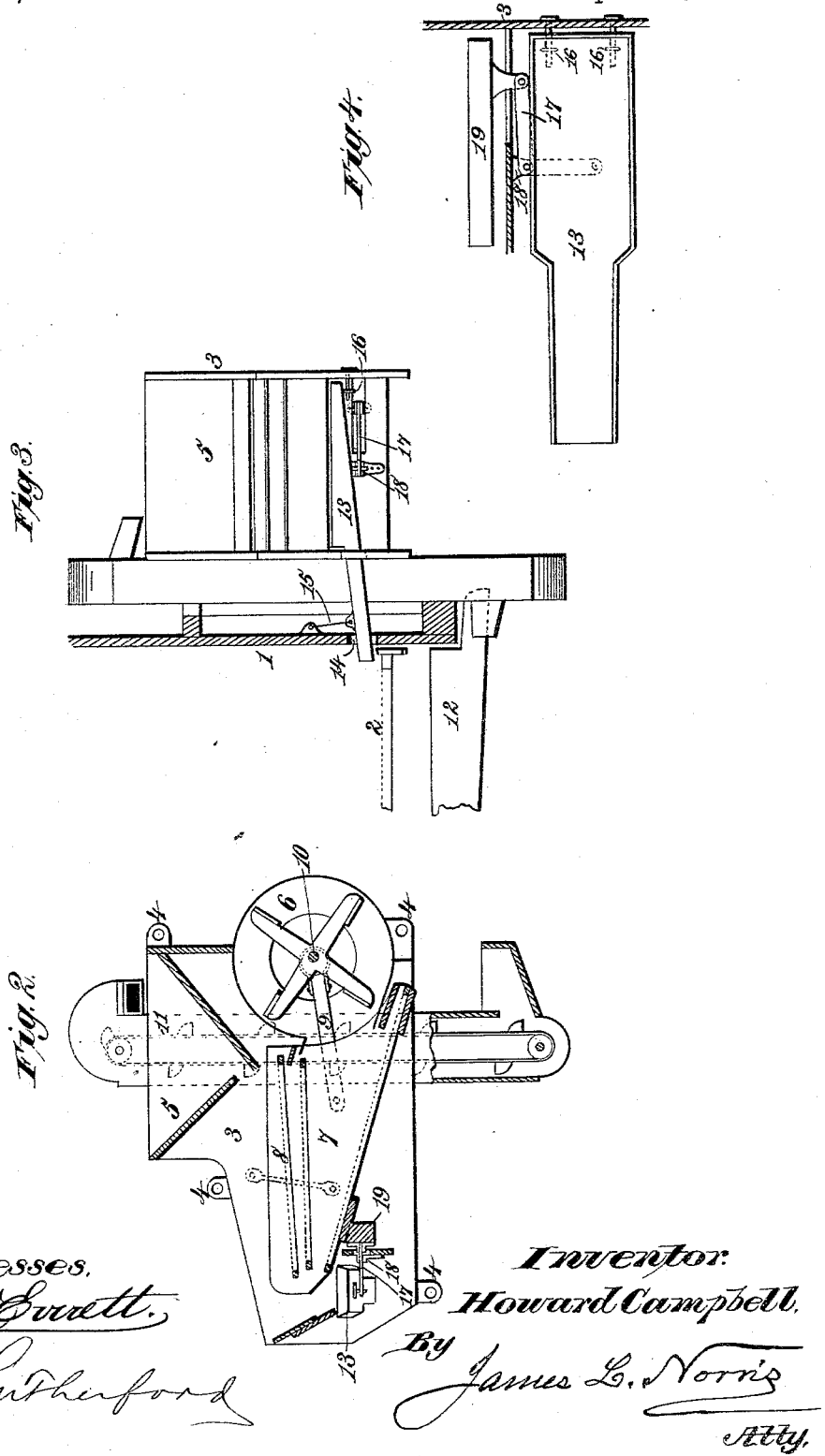

UNITED STATES PATENT OFFICE.

HOWARD CAMPBELL, OF RICHMOND, INDIANA, ASSIGNOR TO GAAR, SCOTT & COMPANY, OF SAME PLACE.

RECLEANING ATTACHMENT FOR CLOVER THRASHING AND HULLING MACHINES.

SPECIFICATION forming part of Letters Patent No. 315,906, dated April 14, 1885.

Application filed January 22, 1885. (No model.)

*To all whom it may concern:*

Be it known that I, HOWARD CAMPBELL, a citizen of the United States, residing at Richmond, Wayne county, Indiana, have invented new and useful Improvements in Recleaning Attachments for Clover Thrashing and Hulling Machines, of which the following is a specification.

This invention relates to improvements in that class of recleaning attachments for clover hulling and thrashing machines in which the seed from the machine is delivered to an elevator, which carries the same upward and discharges it into the hopper of the recleaner, from whence it passes to the operating-screens thereof, the tailings from the screens being received by a conductor and carried back to the elevator, to be again elevated and passed through the recleaner—as, for example, in the invention for which Letters Patent No. 296,922 were issued to me April 15, 1884. In such the tailings containing foul stuff are continuously carried around and through the recleaner, thereby clogging the sieves and encumbering their perfect operation, and also interfering with the perfect cleaning of the seed.

The object of my present invention is to avoid these objections; and to such ends my invention consists in the combination, with a clover thrashing and hulling machine and a recleaning attachment attached thereto, of a moving or shaking conveyer arranged beneath the discharge end of the recleaner screen or screens, and extending through the thrashing and hulling machine above the riddle of the main shoe thereof, for taking the tailings from the recleaner and discharging them directly upon the riddle of the main shoe of the thrasher and huller.

The invention is illustrated in the accompanying drawings, in which Figure 1 is a side elevation of part of a grain-separator with my invention connected therewith; Fig. 2, a view with the outer side wall of the recleaner removed; Fig. 3, a rear end of the recleaner, showing a portion of the grain-separator in section; and Fig. 4, a detail plan view of the moving conveyer and suitable mechanism for operating it.

In order to enable those skilled in the art to make and use my invention, I will now describe the same in detail, reference being made to the drawings, where—

The number 1 indicates the frame of a grain-separator or clover thrashing and hulling machine, and 2 one of the riddles of the main shoe thereof.

The frame 3 of the recleaner is secured to the wall of the separator, as by screws passing through lugs 4, such recleaner comprising, as here shown, the receiving-hopper 5, the fan or blower 6, the vibratory or shaking shoe 7, containing one or more screens, 8, and operated by a pitman, 9, from the fan-shaft 10 or otherwise.

An elevator is arranged between the recleaner-frame and the wall of the separator; and it consists, preferably, of an endless band or chain, 11, traveling around top and bottom wheels, and carrying buckets to take up the tailings, &c., received from the separator by a chute, 12, and conveying the same upward to the receiving-hopper 5.

A movable conveyer, composed, as here shown, of a trough-shaped spout, 13, is suspended transversely in the rear end of the recleaner-frame, directly beneath the discharge end of the shaking-shoe and the screen or screens thereof, such spout passing through an opening in the inner wall of the recleaner-frame, and through a similar opening, 14, in the wall of the grain-separator, so that the discharge end of the spout will be above the riddle 2 of the main shoe of the separator. The spout 13 is inclined in a downward direction from its inner end, which is supported by suitable flexible connections, 15, attached to the separator-frame, while the other end of the spout is suspended by links 16 from the recleaner-frame in such manner that the spout is free to be vibrated in a horizontal plane.

In order to move the spout and thereby compel the tailings to pass to the riddle of the separator, I provide a rocker-arm or bell-crank lever, 17, pivoted at its angle to a suitable fixed support, 18, and pivotally connected at its ends, respectively, to the spout and to a block, 19, attached to the inclined bottom wall of the shaking shoe 7 of the recleaner, whereby the conveyer is operated by the movements of the said shoe.

The mixed grain and tailings, together with the shives and other light foreign and foul matter, pass from the hopper of the recleaner to the screen or screens thereof, and the tailings pass from the discharge end of the screen or screens into the spout 13, the dust and lighter parts of foul stuff being blown out and fall on the ground. The shives and other heavier foul stuff are screened out and by the air-blast from the fan or blower driven through the open rear end of the recleaner to the spout 13. The tailings in the spout are by the movement of the latter carried into the separator and delivered upon the riddle 2, where the wind-currents from the fan or blower of the separator so operate that the seed contained in the tailings passes through the riddle and goes out with the other clean seed, while the foreign matter is screened out and falls on the ground beneath the machine, so that the shives and other foul matter do not again pass through the recleaner, thereby preventing the sieves thereof from being encumbered in their operation.

Having thus described my invention, what I claim is—

1. The combination, with a thrashing-machine provided with a riddle, of a recleaner having a screen, and a moving conveyer arranged beneath the discharge end of the screen, for carrying the tailings from the screen of the recleaner to the riddle of the thrashing-machine, substantially as described.

2. The combination, with a thrashing-machine provided with a riddle, of a recleaner at one side thereof provided with a shaking shoe having a screen, and a moving conveyer operated by the movements of the shoe, for conveying the tailings from the screen to the riddle of the thrashing-machine, substantially as described.

3. The combination, with a thrashing-machine, of a recleaner at one side thereof provided with a shaking shoe having a screen, an inclined trough-shaped spout arranged transverse to the recleaner-frame and conveying the tailings from the screen through the wall of the thrasher, the riddle thereof, means for shaking the spout, and means for suspending the same, substantially as described.

In testimony whereof I affix my signature in presence of two witnesses.

HOWARD CAMPBELL.

Witnesses:
E. H. DENNIS,
JOSEPH B. CRAIGHEAD.